United States Patent
Kim et al.

(10) Patent No.: US 9,241,257 B1
(45) Date of Patent: Jan. 19, 2016

(54) MOBILE DEVICE AND CONTROL METHOD THEREOF

(71) Applicant: LG ELECTRONICS INC., Seoul (KR)

(72) Inventors: Jihwan Kim, Seoul (KR); Yongsin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/490,811

(22) Filed: Sep. 19, 2014

(30) Foreign Application Priority Data

Jul. 17, 2014 (KR) .......................... 10-2014-0090339

(51) Int. Cl.
*H04M 1/66* (2006.01)
*H04W 8/22* (2009.01)
*H04W 12/06* (2009.01)

(52) U.S. Cl.
CPC ................ *H04W 8/22* (2013.01); *H04W 12/06* (2013.01)

(58) Field of Classification Search
CPC .......... G06F 21/629; G06F 2221/2149; G06F 2221/2113; H04W 12/08; H04W 88/02
USPC ......................................................... 455/411
See application file for complete search history.

(56) References Cited

U.S. PATENT DOCUMENTS

| | | | |
|---|---|---|---|
| 6,223,029 B1 | 4/2001 | Stenman et al. | |
| 2011/0177802 A1 | 7/2011 | Gupta | |
| 2012/0157044 A1* | 6/2012 | Kim | G06F 21/84 455/410 |
| 2012/0304280 A1 | 11/2012 | Hayashida | |
| 2013/0307665 A1 | 11/2013 | Wang et al. | |
| 2014/0141721 A1 | 5/2014 | Kim et al. | |
| 2014/0148126 A1 | 5/2014 | Kim | |
| 2014/0283142 A1* | 9/2014 | Shepherd | G06F 3/0482 726/30 |
| 2014/0325679 A1* | 10/2014 | Heo | G06F 21/60 726/28 |

* cited by examiner

*Primary Examiner* — Don N Vo
(74) *Attorney, Agent, or Firm* — Birch, Stewart, Kolasch & Birch, LLP

(57) ABSTRACT

A mobile device and a control method thereof are disclosed. The control method of the mobile device includes receiving device information from at least one external device, detecting at least one controllable external device based on the received device information, and switching the mobile device to a sharing standby mode when the mobile device is charging or when an input to the mobile device is not sensed for a predetermined time. The mobile device in the sharing standby mode may switch to a personal mode or a sharing mode based on whether mobile device receives a personal authentication input.

20 Claims, 9 Drawing Sheets

FIG. 5
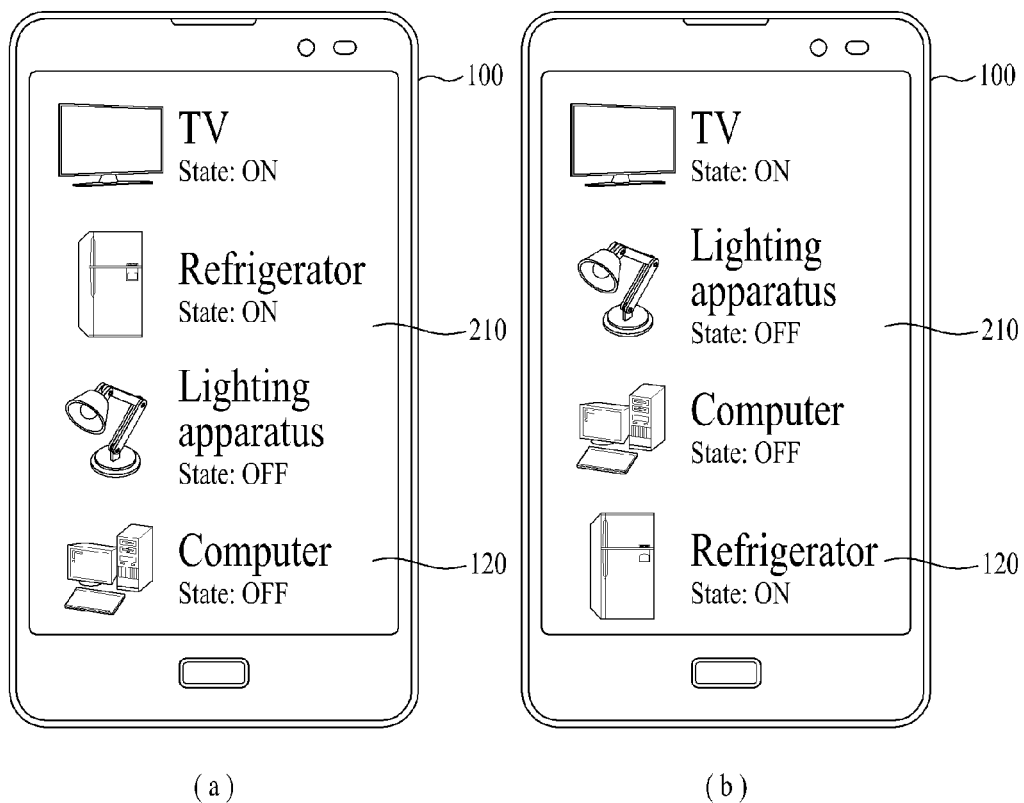
(a) (b)
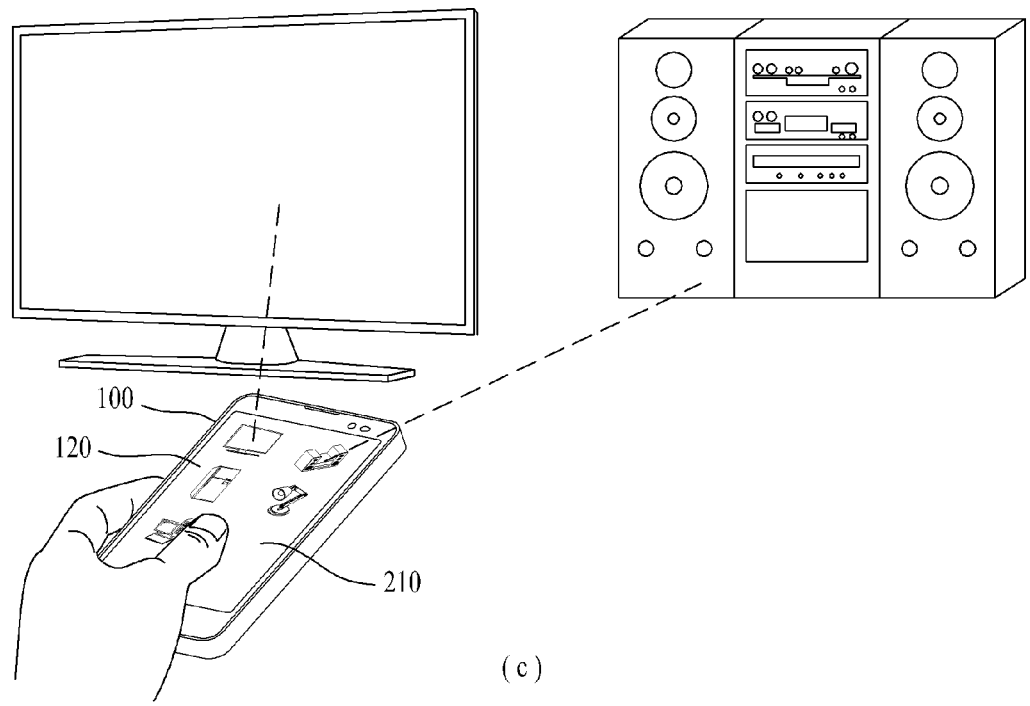
(c)

FIG. 6
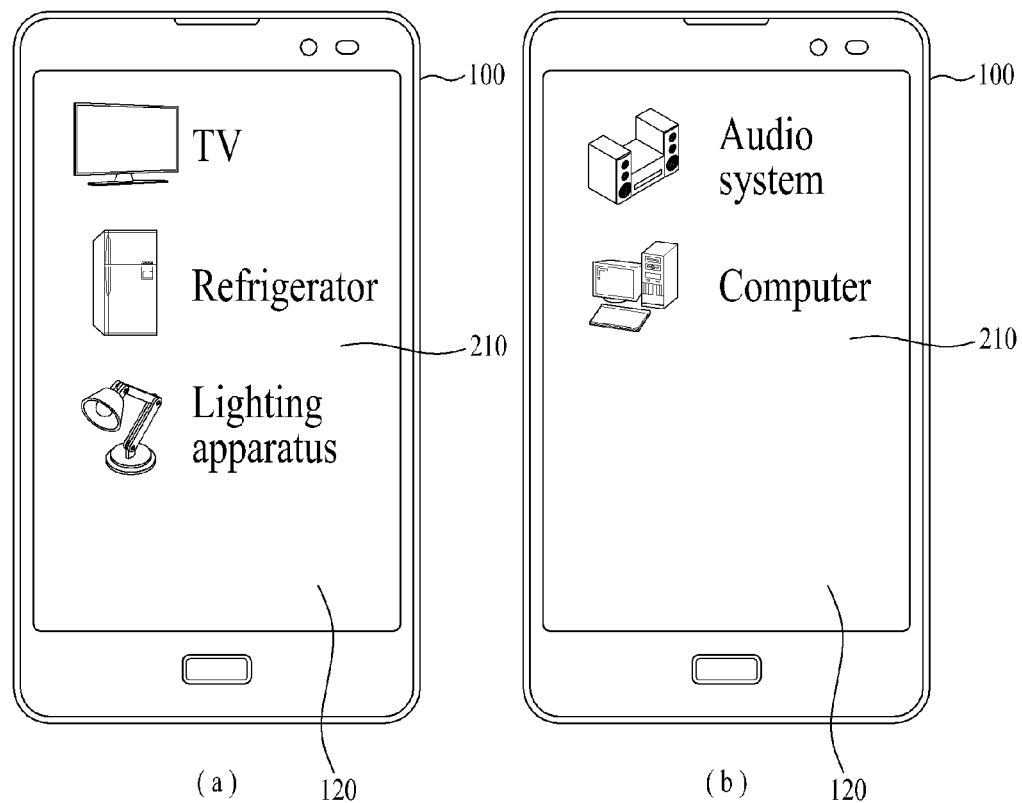
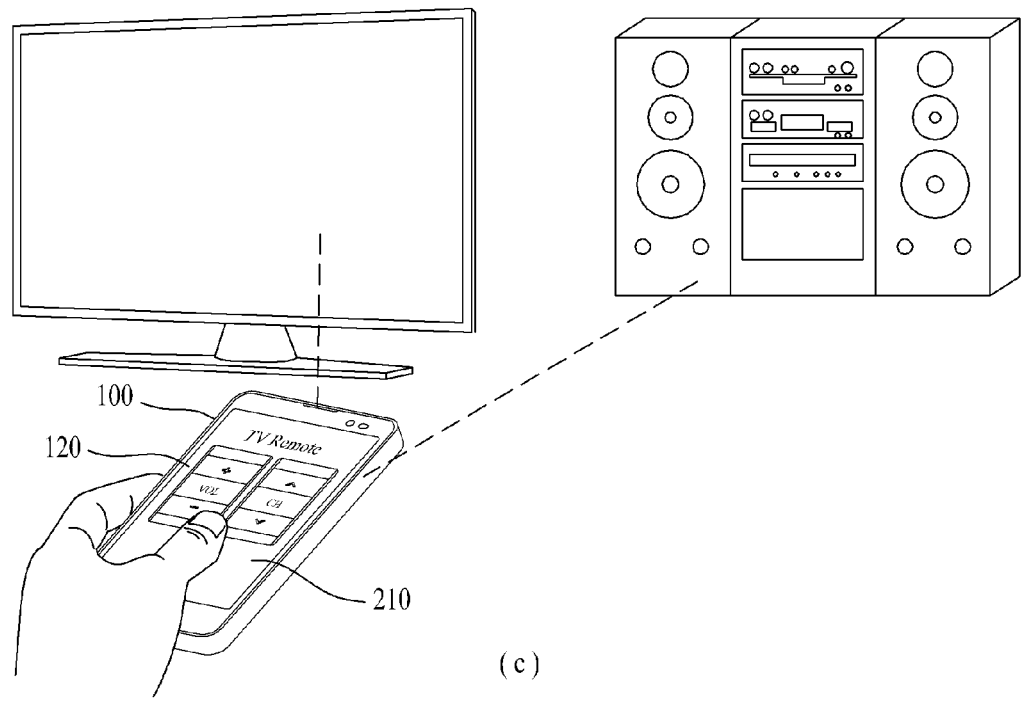

FIG. 8
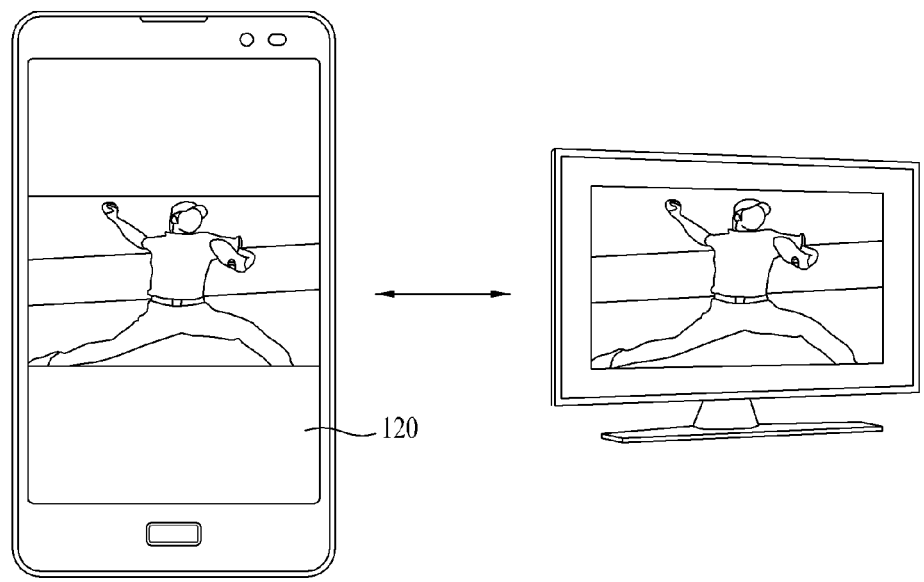
(a)
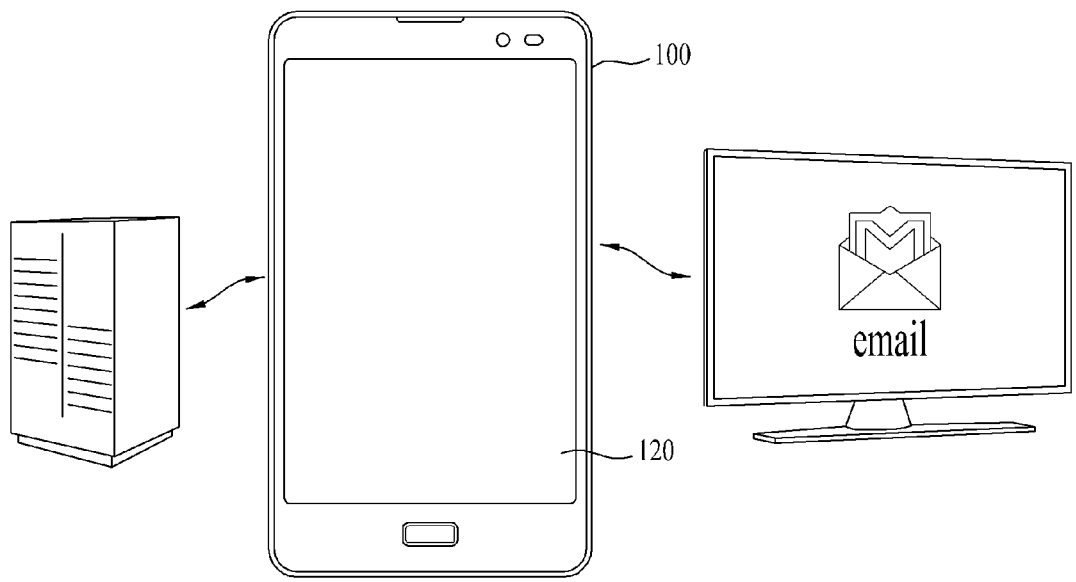
(b)

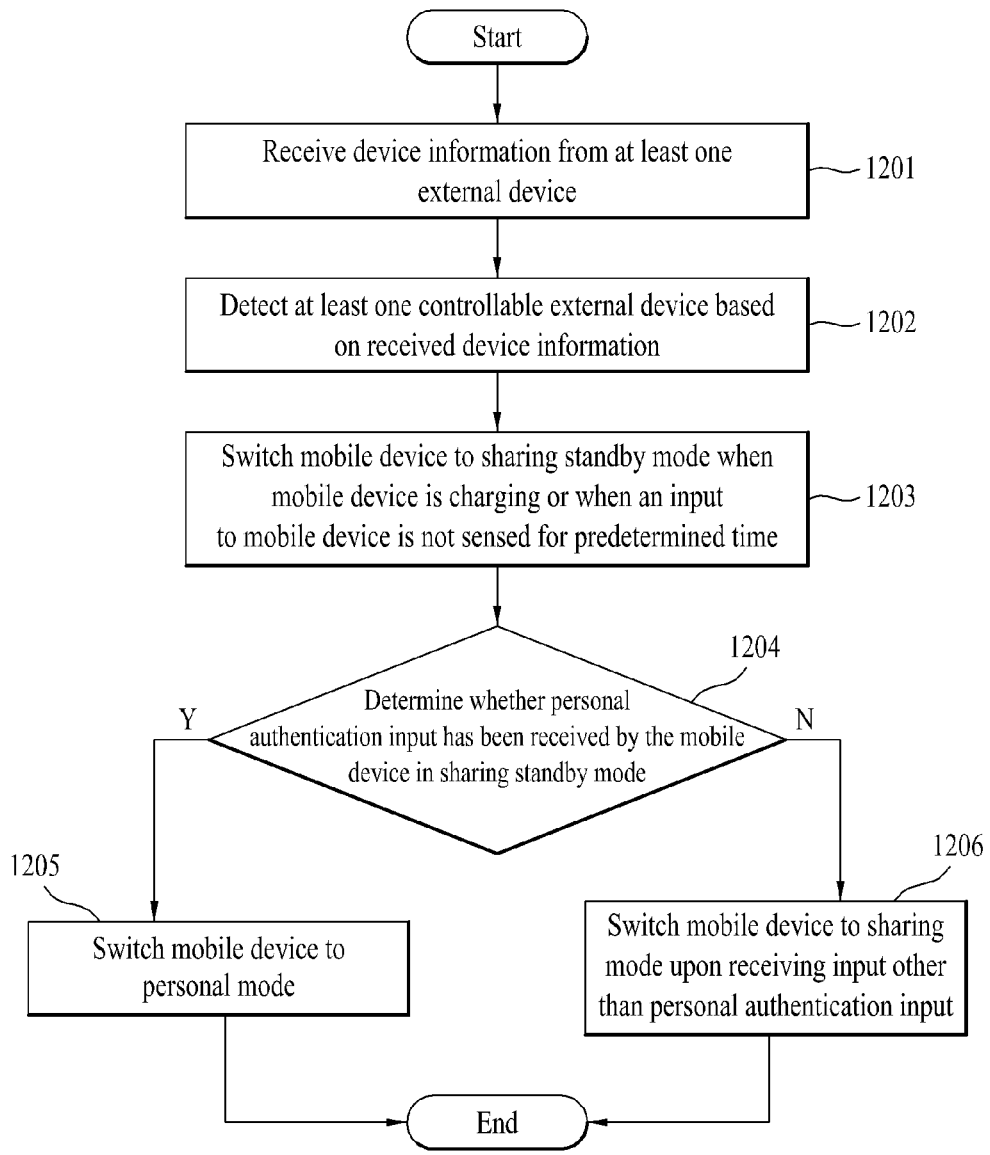

MOBILE DEVICE AND CONTROL METHOD THEREOF

This application claims the benefit of Korean Patent Application No. 10-2014-0090339, filed on Jul. 17, 2014, which is hereby incorporated by reference as if fully set forth herein.

BACKGROUND

1. Technical Field

The present specification relates to a mobile device and a control method thereof.

2. Discussion of the Related Art

FIG. 1 is a view showing various use examples of a mobile device.

As shown in FIG. 1, utilization of a mobile device has increased as the mobile device has larger number of functions. For example, as shown in the left side of FIG. 1, the mobile device may be used for telephone conversation. Reception/transmission of a call and reception/transmission of a message performed by the mobile device are general functions of the mobile device.

In addition, for example, as shown in the right side of FIG. 1, the mobile device may be used to control various external devices. In particular, various external devices may be accessible to the Internet based on technology of the Internet of Things (IoT). Consequently, the mobile device may access the Internet to control various external devices. In addition, the mobile device may control external devices using near field communication (NFC), WiFi, WiDi, or infrared communication based on technology of Ubiquitous Computing in addition to the Internet.

As previously described, utilization of the mobile device has further increased. In addition, many people own at least one mobile device as the result of miniaturization of the mobile device. The mobile device may store an address book and received messages. For this reason, it is necessary to protect privacy. That is, the mobile device corresponds to a personal possession of one individual.

As shown in the right side of FIG. 1, on the other hand, the external devices, which may be controlled using the mobile device, may not be personal possessions of one individual. For example, in a case in which a television is installed in a home, all members of a family may have right to access the television. Consequently, the other members of the family as well as the owner of the mobile device may wish to control the television using the mobile device. However, the use of the mobile device by the other members of the family may intrude on a privacy of the owner of the mobile device. Since demand for protection of privacy and demand for sharing the mobile device conflict with each other, it is difficult to promote control of external devices using the mobile device.

SUMMARY

Accordingly, the present specification is directed to a mobile device and a control method thereof that substantially obviate one or more problems due to limitations and disadvantages of the related art.

An object of the present specification is to provide a mobile device that controls external devices and a control method thereof.

Another object of the present specification is to provide an improved mobile device that can be shared under a specific condition.

Additional advantages, objects, and features of embodiments will be set forth in part in the description which follows and in part will become apparent to those having ordinary skill in the art upon examination of the following or may be learned from practice of embodiments. The objectives and other advantages of embodiments may be realized and attained by the structure particularly pointed out in the written description and claims hereof as well as the appended drawings.

To achieve these objects and other advantages and in accordance with the purpose of the present specification, as embodied and broadly described herein, a mobile device includes a display unit, a communication unit configured to communicate with external devices over a wired or wireless network and to receive device information from at least one of the external devices, and a processor configured to control the display unit and the communication unit, wherein the processor is further configured to detect at least one controllable external device from the external devices based on the received device information, switch the mobile device to a sharing standby mode when the mobile device is charging or no input is sensed in the mobile device for a predetermined time, switch the mobile device to a personal mode when the mobile device in the sharing standby mode receives a personal authentication input coinciding with predetermined personal authentication information, the personal mode including access to the mobile device and the at least one controllable external device, and switch the mobile device to a sharing mode when the mobile device in the sharing standby mode receives an input other than the personal authentication input, the sharing mode including access only to the at least one controllable external device.

In another aspect of the present specification, a method of controlling an external device using a mobile device includes receiving device information from at least one external device over a wired or wireless network, detecting at least one controllable external device based on the received device information, switching the mobile device to a sharing standby mode when the mobile device is charging or when an input to the mobile device is not sensed for a predetermined time, switching the mobile device to a personal mode when the mobile device in the sharing standby mode receives a personal authentication input, and switching the mobile device to a sharing mode when the mobile device in the sharing standby mode receives an input other than the personal authentication input, wherein the personal mode includes access to the mobile device and the at least one controllable external device and the sharing mode includes access only to the at least one controllable external device.

It is to be understood that both the foregoing general description and the following detailed description of embodiments are exemplary and explanatory and are intended to provide further explanation of embodiments as claimed.

BRIEF DESCRIPTION OF THE DRAWINGS

The accompanying drawings, which are included to provide a further understanding of embodiments and are incorporated in and constitute a part of this application, illustrate embodiments and together with the description serve to explain the principle of embodiments. In the drawings:

FIG. 5 is a view showing an example of a list of controllable external devices;

FIG. 6 is a view showing a list of controllable external devices based on the position of the mobile device according to an embodiment;

FIG. 8 is a view showing control of an external device according to an embodiment;

FIG. 12 is a flowchart showing a control method of the mobile device according to an embodiment.

DESCRIPTION OF SPECIFIC EMBODIMENTS

Reference will now be made in detail to the preferred embodiments, examples of which are illustrated in the accompanying drawings. It should be noted herein that these embodiments are only for illustrative purposes and the protection scope of the present specification is not limited or restricted thereto.

Terms used in present specification are general terms selected in consideration of functions and widely used at the present time. However, such terms may vary depending upon intentions of those skilled in the art to which the present specification pertains, usual practices, or appearance of new technology. In a specific case, some terms may be selected by the applicant of the present application. In this case, meanings of such terms will be described in corresponding paragraphs of present specification. Therefore, it should be noted that terms used in present specification be interpreted based on real meanings of the terms and the present specification, not simple names of the terms.

In the present specification, a mobile device may include a cellular phone, a wireless communication phone, a smart phone, a tablet PC, a personal digital assistant (PDA), a smart watch, and any other personal communication devices. In addition, a (controllable) mobile device of the present specification may include a refrigerator, a television, a lighting apparatus, a sensor, a closed circuit television (CCTV), an air conditioner, and a desktop PC. In addition, the (controllable) mobile device of the present specification may include any other communication devices.

Figure 1:
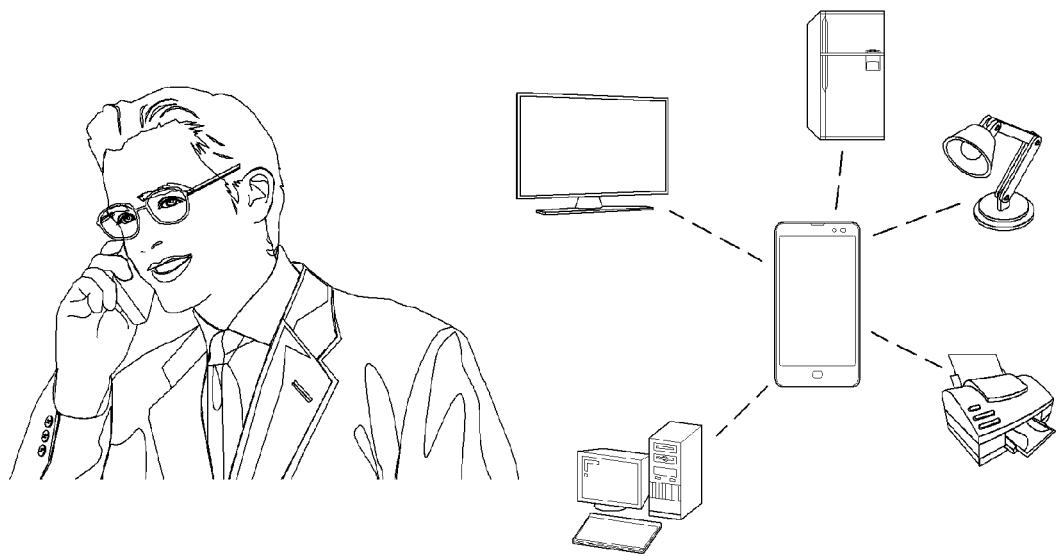
FIG. 1 is a view showing various use examples of a mobile device.
Figure 2:
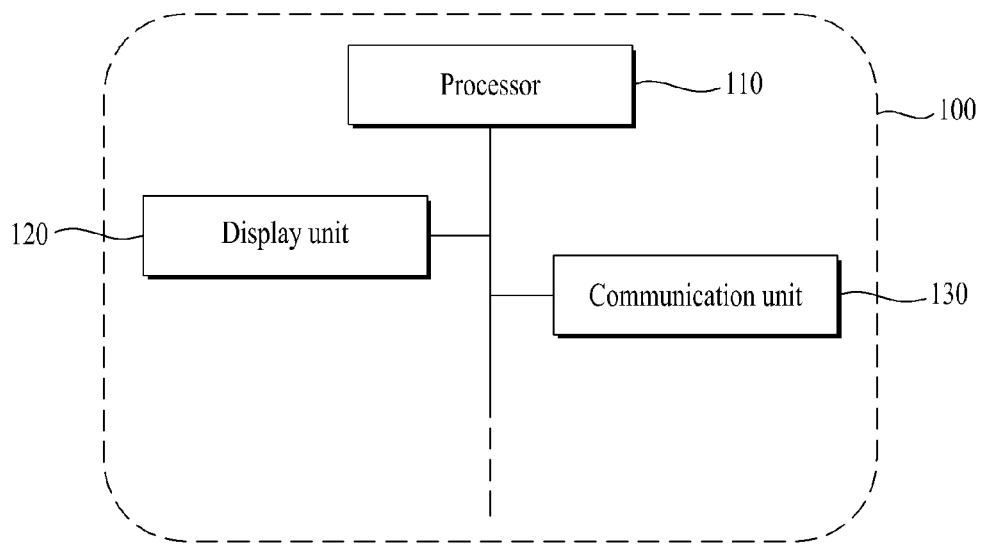
FIG. 2 is a view showing the construction of a mobile device according to an embodiment.

FIG. 2 is a view showing the construction of a mobile device 100 according to an embodiment.

The mobile device 100 according to the embodiment may include a display unit 120, a communication unit 130, and a processor 110 to control the display unit 120 and the communication unit 130.

The display unit 120 may display one or more images. The display unit 120 may include a liquid crystal display (LCD), a plasma display, or another type of display. In addition, the display unit 120 may include a foldable display, a rollable display, an extendible display, a stretchable display, or another form factor display.

In addition, the display unit 120 may include a touch sensor. The touch sensor may be located on the display unit 120 or in the display unit 120. The touch sensor may sense a touch or non-touch input, such as a sliding touch input, a multi touch input, a long-press touch input, a short-press touch input, a drag touch input, a hovering input, or a flicking touch input. Furthermore, the touch sensor may also sense a touch input performed by various input devices, such as a touch pen and a stylus pen. The touch sensor may transmit the touch input sensing result to the processor 110.

The communication unit 130 may receive device information from an external device. In addition, the communication unit 130 may communicate with the external device over a wired or wireless network using various protocols. Specifically, the communication unit 130 may transmit and receive data to and from the external device. For example, the communication unit 130 may access the wireless network using Wireless LAN (WLAN), Wireless LAN Communication based on IEEE 802.11, Wireless Broadband (Wibro), World Interoperability for Microwave Access (Wimax), High Speed Downlink Packet Access (HSDPA), Bluetooth, Near Field Communication (NFC), etc. In addition, the communication unit 130 may access the Internet over the wired or wireless network.

The processor 110 may control the display unit 120 and the communication unit 130. In addition, the processor 110 may control other components included in the mobile device 100. The processor 110 may process data of the mobile device 100 to execute various applications. The processor 110 may control an external device based on a command. In addition, the processor 110 may control content executed by the mobile device based on a control command.

In addition, the processor 110 may receive device information from external devices using the communication unit 130 and may detect at least one controllable external device from the external devices based on the received device information. The device information from the external device may include at least one selected from a communication standard of the external device, a control possibility of the external device, a location of the external device, an operation possibility of the external device, a name of the external device, a kind of the external device, Internet access possibility of the external device, and a function of the external device.

In addition, the mobile device 100 may further include other components not shown in FIG. 2. For example, the mobile device 100 may further include a camera, a memory, a power source, a housing, at least one sensor (for example, an acceleration sensor, a gyro sensor, a geomagnetic sensor, a GPS sensor, a pressure sensor, an altitude sensor, or a proximity sensor), a voice receiving unit, a voice output unit, or other components.

FIG. 2 is a block diagram of a mobile device 100 according to an embodiment. The blocks shown in the drawing individually indicate hardware components of the mobile device in a logical manner. Consequently, the components of the mobile device 100 as described above may be combined into a single chip or a plurality of chips based on design of the device.

Meanwhile, the mobile device 100 of the present specification may be controlled based on various inputs. For example, the mobile device 100 may include a physical button. The mobile device 100 may receive an input from the physical button. In addition, the mobile device 100 may include a voice receiving unit. The mobile device 100 may perform voice recognition based on a received voice and may be controlled based on the voice recognition. Specifically, the mobile device 100 may perform voice recognition on a per syllable, word, or sentence basis. The mobile device 100 may combine the recognized syllable, word, or sentence to perform the voice recognition. In addition, the mobile device 100 may perform image analysis using a camera and may be controlled based on the analyzed image. In addition, the mobile device 100 may include a touch sensing unit. The mobile device 100 may be controlled based on a touch input to the touch sensing unit. Furthermore, the mobile device 100 may be controlled based on a combination of the above-described inputs. In addition, the mobile device 100 may control the external device based on the above-described inputs and a combination thereof.

Hereinafter, operation performed by the mobile device 100 will be described with reference to FIGS. 3 to 10. The construction of the mobile device 100 may be used for operation of the mobile device 100, which will hereinafter be described. In addition, it may be assumed that operation of the mobile device 100 is identical to that of the processor 110 in the following description.

Figure 3:
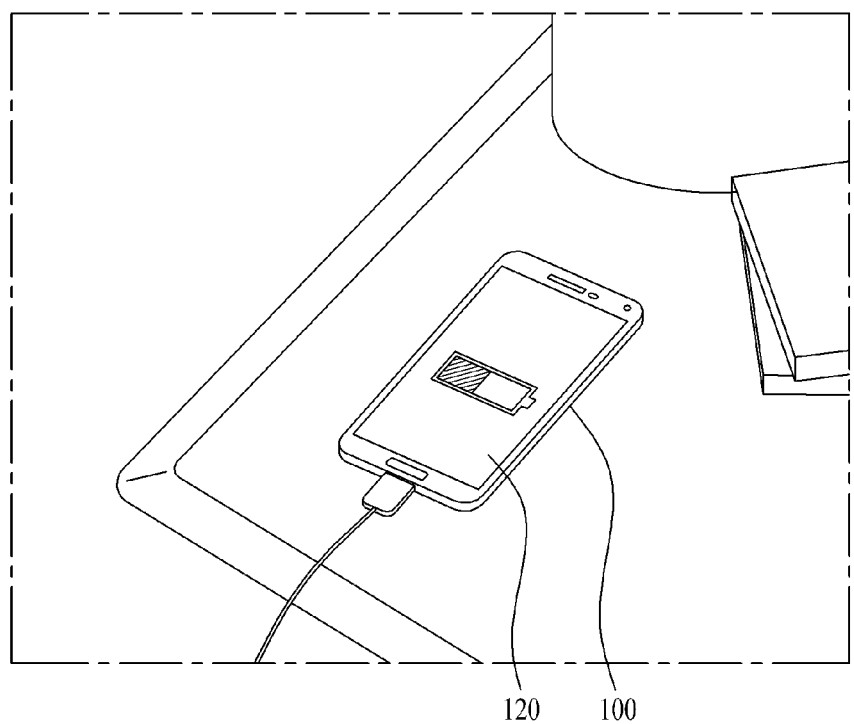
FIG. 3 is a view showing the mobile device under charge.

FIG. 3 is a view showing the mobile device under charge.

In general, the mobile device 100 is apt to be charged at a predetermined position. For example, many people charge their own mobile devices at home. In other words, the mobile device 100 is apt to be charged at a place familiar to a user of the mobile device 100. In addition, in a case in which the mobile device 100 is located at a place familiar to a user of the mobile device 100, people (for example, family members, fellow workers, and others) familiar to the user of the mobile device 100 may easily access the mobile device 100. In a case in which the mobile device is charging as shown in FIG. 3, therefore, other users may control an external device using the mobile device 100.

In addition, in a case in which an input to the mobile device 100 is not performed for a predetermined time, other users may control an external device using the mobile device 100. In a case in which an input to the mobile device 100 is not sensed for a long time, there is a high possibility that the user of the mobile device 100 does not currently use the mobile device 100. In addition, the user of the mobile device 100 does not put the mobile device 100 at a place which is not familiar to the user of the mobile device 100. For example, in a case in which the user of the mobile device 100 moves from a park bench to a rest room, the user of the mobile device 100 would not leave the mobile device 100 on the bench. Consequently, there is a low possibility that another user who has no acquaintance with the user of the mobile device 100 accesses the mobile device 100.

In a case in which the mobile device 100 is charging or an input to the mobile device 100 is not sensed for a predetermined time, therefore, other users may control an external device using the mobile device 100. In this case, it is possible to maximize utilization of the mobile device while minimizing exposure of privacy of the user of the mobile device 100. Although the above conditions are satisfied, however, there is still present a risk of exposing privacy of the user of the mobile device 100. Consequently, there is a necessity to prevent another user's full access to the mobile device 100.

In a case in which the mobile device 100 is charging or an input to the mobile device 100 is not sensed for a predetermined time, the mobile device 100 of the present specification switches to a sharing standby mode. The sharing standby mode is similar to a general standby mode in that a user input is waited for. For example, upon receiving a personal authentication input, the mobile device in the general standby mode allows overall access to the mobile device. On the other hand, upon receiving a personal authentication input coinciding with predetermined personal authentication information, the mobile device 100 of the present specification in the sharing standby mode switches to a personal mode. The personal mode includes access to the mobile device 100 and an external derive. That is, the mobile device 100 in the personal mode allows user's overall access to the mobile device 100.

Meanwhile, upon receiving an input (for example, an incorrect password input, a touch input on an arbitrary position, or an input performed by a physical button on the mobile device) other than the personal authentication input, the mobile device in the general standby mode does not allow access to the mobile device. On the other hand, upon receiving an input other than the personal authentication input, the mobile device 100 of the present specification in the sharing standby mode switches to a sharing mode. The sharing mode includes only access to a (controllable) external device. In a case in which the mobile device 100 is in the sharing mode, therefore, it is not possible for the user to access personal information stored in the mobile device 100.

In addition, the mobile device 100 of the present specification may switch among the above modes (the personal mode, the sharing mode, and the sharing standby mode). For example, in a case in which the mobile device 100 in the personal mode or the sharing mode satisfies a condition necessary for switching to the sharing standby mode, the mobile device 100 may switch to the sharing standby mode. That is, in a case in which the mobile device 100 in the personal mode or the sharing mode is charging or an input to the mobile device 100 in the personal mode or the sharing mode is not sensed for a predetermined time, the mobile device 100 may switch to the sharing standby mode. Besides, an additional interface may be provided to perform switching among the above modes.

In addition, the personal authentication input to the mobile device 100 of the present specification may include various types of inputs. For example, the personal authentication input may include at least one selected from a password, a pattern, a fingerprint recognition, and an iris recognition.

Hereinafter, control of an external device using the mobile device 100 will be described.

Figure 4:
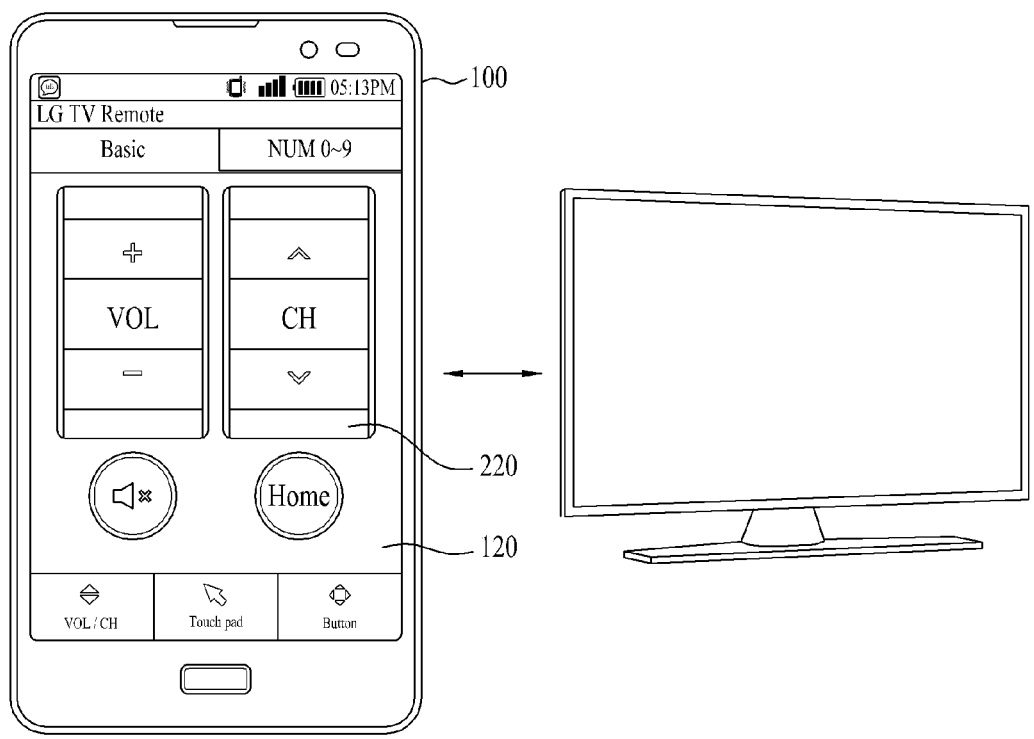
FIG. 4 is a view showing an example of the mobile device that controls a television.

FIG. 4 is a view showing an example of the mobile device that controls a television.

In a case in which the mobile device 100 switches to the sharing mode, the mobile device 100 may display a control interface 220 to provide control of a controllable external device on the display unit 120. The controllable external device shown in FIG. 4 is a television. The mobile device 100 may display the control interface 220 corresponding to the detected controllable external device. For example, in a case in which the controllable external device is a television as shown in FIG. 4, the control interface 220 may include images for volume adjustment and channel adjustment. FIG. 4 shows an example of the control interface 220. The control interface 220 may be changed based on the type of the controllable external device. Alternatively, control interface 220 may have another form according to selection of a manufacturer.

The control interface 220 may be changed based on the function of the controllable external device. For example, in a case in which the external device includes a display means, the control interface 220 may include a trigger for mirroring to the external device or mirroring from the external device. In addition, in a case in which the external device is a device that is accessible to the Internet, the control interface 220 may include tethering of data.

Meanwhile, the mobile device 100 may be controlled based on voice recognition and control the controllable external device based on the voice recognition. For example, in a case in which a user says "volume up," the mobile device 100 of FIG. 4 may increase the volume of the television. In addition, the mobile device 100 may identify a user based on a received voice input and may match the identified user with each external device. In addition, in a case in which the mobile device 100 in the sharing mode receives a voice input, the mobile device 100 may display the control interface 220 to provide control of one of at least one controllable external device matched with the identified user on the display unit 120. In addition, the mobile device 100 may control the matched external device based on the voice recognition. That is, each external device may be individualized to each user based on the voice recognition. For example, a television may be individualized to an owner of the mobile device 100 and an audio system may be individualized to a son of the owner of the mobile device 100. In a case in which the owner of the mobile device 100 says "volume up" to the mobile device 100 in the sharing mode, therefore, the mobile device 100 may increase the volume of the television. On the other hand, in a case in which the son of the owner of the mobile device 100 says "volume up" to the mobile device 100 in the sharing mode, therefore, the mobile device 100 may increase the volume of the audio system.

In a case in which the mobile device 100 switches to the sharing mode and only one controllable external device is detected, the control interface 220 corresponding to the detected controllable external device may be displayed. In a case in which a plurality of controllable external devices is detected, on the other hand, it is necessary to select an external device to be controlled from the controllable external devices.

The control interface 220 as shown in FIG. 4 may be provided based on selection from a list of controllable external devices, which will hereinafter be described. Hereinafter, a repeated description will be omitted.

FIG. 5 is a view showing an example of a list of controllable external devices.

The mobile device 100 may provide a list 210 of at least one controllable external device to the control interface based on received device information. In addition, the mobile device 100 may receive selection of one controllable external device from the list 210 of controllable external devices and may display one of predetermined device control interfaces on the display unit 120 based on the type of the selected controllable external device. For example, in a case in which the user selects a television from the list 210 of controllable external devices as shown in FIG. 5(*a*), the control interface as shown in FIG. 4 may be provided to the user. Meanwhile, the predetermined device control interfaces may include control corresponding to different types of external devices and each type of external device. For example, as previously described with reference to FIG. 4, for the type of external device including the display means, mirroring of the display may be included in the control interface as control corresponding to the external device.

In addition, the list 210 of controllable external devices may include at least one selected from a name, an icon, and a state of each external device. For example, as shown in FIG. 5, the list 210 of controllable external devices may include at least one selected from an icon, a name, and a state of each external device.

Meanwhile, the list 210 of controllable external devices may be a portion of the control interface. Specifically, the user may select one device from the list 210 of controllable external devices to the more specific control interface as shown in FIG. 4. On the other hand, the user may control the external device using the list 210 of controllable external devices. For example, control of a lighting apparatus shown in FIG. 5 excluding turning the lighting apparatus on or off may be unnecessary. In this case, the user may simply select an icon or a name corresponding to the lighting apparatus from the list 210 of controllable external devices to turn the lighting apparatus on or off. In addition, the user may drag the icon of the television on the list 210 of controllable external devices upward or downward to change the channel of the television.

The control of the external device as described above is illustrative. Various control methods may be supported based on types of the controllable external devices.

In addition, the list 210 of controllable external devices may be aligned based on various criteria. For example, the list 210 of controllable external devices may be aligned according to the names of the devices. In addition, the list 210 of controllable external devices may be aligned based on states of the external devices. The states of the external devices may include at least one selected from the position, an operational possibility, and a function of each external device. For example, as shown in FIG. 5(*a*), external devices which are turned on may be located at the upper side of the list 210 of controllable external devices.

FIG. 5(*b*) shows the list 210 of controllable external devices arranged based on the distances between the mobile device 100 and the external devices. For example, external devices closer to the mobile device 100 may be located at higher positions of the list 210 of controllable external devices. In another embodiment, currently operable external devices may be located at the upper side of the list 210 of controllable external devices.

In addition, orientation of the external devices to the mobile device may be reflected in the list 210 of controllable external devices. For example, in a case in which the television is located in an eleven o'clock direction from the mobile device 100 as shown in FIG. 5(*c*), the mobile device 100 may display an icon or a name of the television on the display unit 120 in the eleven o'clock direction. On the other hand, since the audio system is located in a two o'clock direction from the mobile device 100, the mobile device 100 may display an icon or a name of the audio system on the display unit 120 in the two o'clock direction.

In addition, the list 210 of controllable external devices may be aligned based on a use history. The mobile device 100 may include a memory. The memory may store a use history of each external device. For example, external devices having higher user frequency may be located at the upper side of the list 210 of controllable external devices.

Alignment of the list 210 of controllable external devices described above with reference to FIG. 5 is illustrative. The respective examples may be combined.

FIG. 6 is a view showing a list of controllable external devices based on the position of the mobile device according to an embodiment.

The mobile device 100 may further include a positioning unit configured to determine a position of the mobile device 100 based on at least one selected from between a satellite and a network. The mobile device 100 may store information of external devices related to the position of the mobile device 100 in the memory. The mobile device 100 may provide a list 210 of controllable external devices to the control interface based on the information of the external devices related to the position of the mobile device 100 and the device information. The list 210 of controllable external devices may include at least one selected from a name, an icon, and a state of each controllable external device.

For example, it is assumed that a television, a refrigerator, and a lighting apparatus are located in a living room. In a case in which the mobile device 100 is located in the living room and the mobile device switches to the sharing mode in this state, the mobile device 100 may provide a list 210 of controllable external devices including the television, the refrigerator, and the lighting apparatus as shown in FIG. 6(*a*). On the other hand, it is assumed that an audio system and a computer are located in a bedroom. In a case in which the mobile device 100 is located in the living room and the mobile device switches to the sharing mode in this state, the mobile device 100 may provide a list 210 of controllable external devices including the audio system and the computer as shown in FIG. 6(b).

The information of the external devices related to the position of the mobile device 100 may be created based on the distances between the mobile device 100 and the external devices. In addition, the user may relate specific external devices to the position of the mobile device 100.

The list 210 of controllable external devices related to the position of the mobile device 100 may be aligned according to the embodiments previously described with reference to FIG. 5. Consequently, the types of the external devices included in the list 210 of controllable external devices may be changed according to the position of the mobile device 100. In addition, the aligned sequence of the external devices may be changed.

Meanwhile, the mobile device 100 may select one controllable external device from at least one controllable external device based on the position of the mobile device 100. For example, the mobile device 100 may include an orientation sensing unit to sense an orientation of the mobile device 100. The orientation sensing unit may include at least one selected from a GPS sensor, an accelerometer, a gyro sensor, and a gravity accelerometer. The mobile device 100 may select one controllable external device from at least one controllable external device based on the position and the orientation of the mobile device 100. In addition, the mobile device 100 may display a control interface to provide control of the selected controllable external device on the display unit 120.

For example, it is assumed that a television is located in an eleven o'clock direction from the mobile device 100 and an audio system is located in a two o'clock direction from the mobile device 100 as shown in FIG. 6(c). In this case, the mobile device 100 may select the television, which coincides with an orientation (a twelve o'clock direction) of the mobile device 100 more than the audio system.

In addition, the mobile device 100 may repeatedly select controllable external devices. For example, it is assumed that the television is located in an eleven o'clock direction from the mobile device 100 and the audio system is located in a two o'clock direction from the mobile device 100. The user of the mobile device 100 controlling the television may wish to control the audio system. In this case, the user may move the mobile device 100 in the two o'clock direction. The mobile device 100 may select the audio system as a controllable external device based on the position and the orientation of the mobile device 100 and may display a control interface to provide control of the audio system on the display unit 120.

Figure 7:
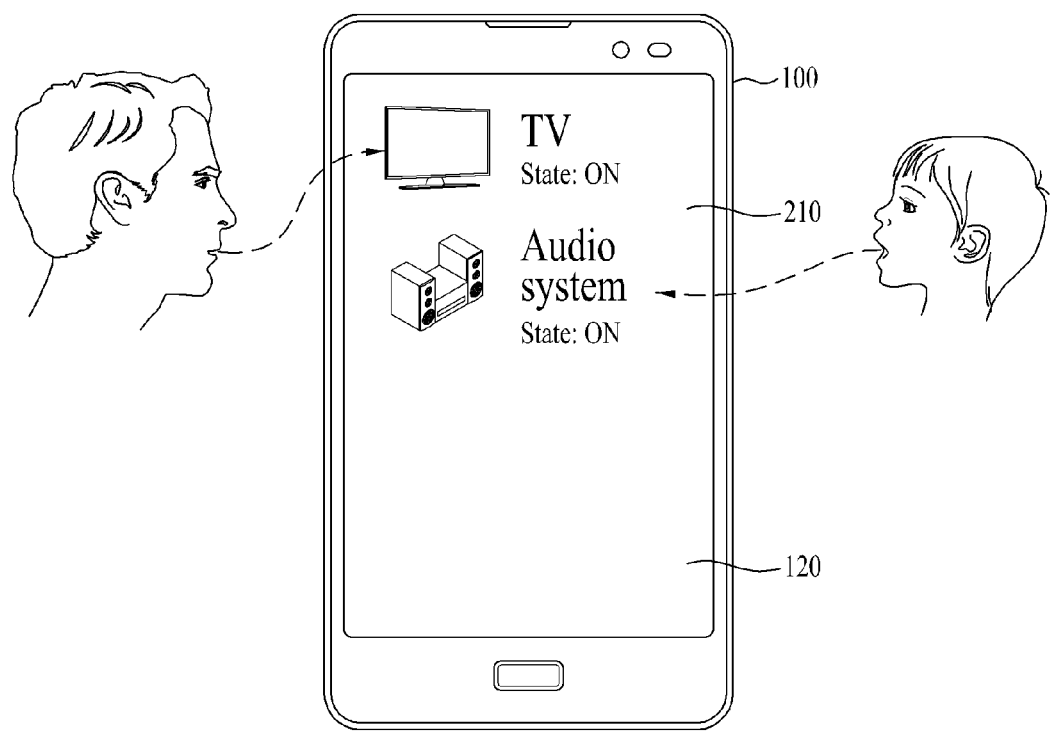
FIG. 7 is a view showing a control interface of an external device according to an embodiment.

FIG. 7 is a view showing a control interface of an external device according to an embodiment.

The mobile device 100 may be controlled based on voice recognition as previously described with reference to FIG. 4. In addition, the mobile device 100 may be controlled based on a received voice while a list 210 of controllable external devices is displayed.

For example, in a case in which the mobile device 100 in the sharing mode receives a voice input, the mobile device 100 may provide control of an external device matched with an identified user. In addition, the mobile device 100 may control the matched external device based on the voice recognition. That is, each external device may be individualized to each user based on the voice recognition. For example, a television may be individualized to an owner of the mobile device 100 and an audio system may be individualized to a son of the owner of the mobile device 100. In a case in which the owner of the mobile device 100 says "volume up" to the mobile device 100 in the sharing mode, therefore, the mobile device 100 may increase the volume of the television. On the other hand, in a case in which the son of the owner of the mobile device 100 says "volume up" to the mobile device 100 in the sharing mode, therefore, the mobile device 100 may increase the volume of the audio system.

FIG. 8 is a view showing control of an external device according to an embodiment.

The mobile device 100 may provide various control operations based on functions of the external device. In a case in which the external device supports mirroring as shown in FIG. 8(a), the mobile device 100 may enable the external device to mirror content of the mobile device 100. On the other hand, the mobile device 100 may mirror content of the external device. In addition, in a case in which the external device is accessible to the Internet as shown in FIG. 8(b), the mobile device 100 may provide tethering.

Figure 9:
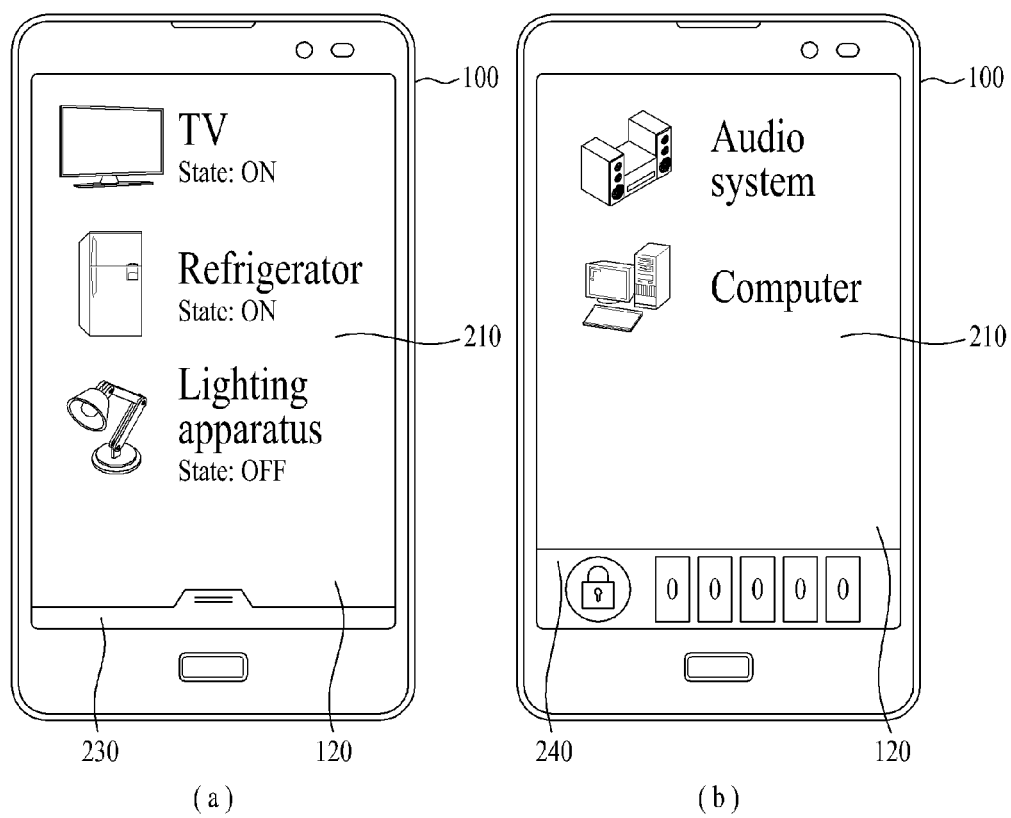
FIG. 9 is a view showing a personal authentication input interface according to an embodiment.

FIG. 9 is a view showing a personal authentication input interface according to an embodiment.

The mobile device 100 in the sharing mode may provide an interface to switch the mobile device 100 to the personal mode. For example, as shown in FIG. 9(a), the mobile device 100 displays the list of controllable external devices included in the control interface on the display unit 120. In addition, the mobile device 100 may also display an icon 230 to trigger a personal authentication input receiving interface. In addition, the user of the mobile device 100 may manipulate (for example, touch, drag, or slide) the icon 230 to trigger the personal authentication input receiving interface. The triggering of the personal authentication input receiving interface as described above is illustrative. The personal authentication input receiving interface may be triggered based on, for example, voice recognition.

FIG. 9(b) shows a personal authentication input interface 240. As previously described with reference to FIG. 9(a), the personal authentication input interface 240 may be triggered based on various inputs. In addition, the mobile device 100 in the sharing mode may always provide the personal authentication input interface 240 without an additional input. The personal authentication input interface 240 shown in FIG. 9(b) may receive a password input, which, however, is illustrative. The personal authentication input interface 240 may be provided for a pattern, fingerprint recognition, voice recognition, or iris recognition.

Figure 10:
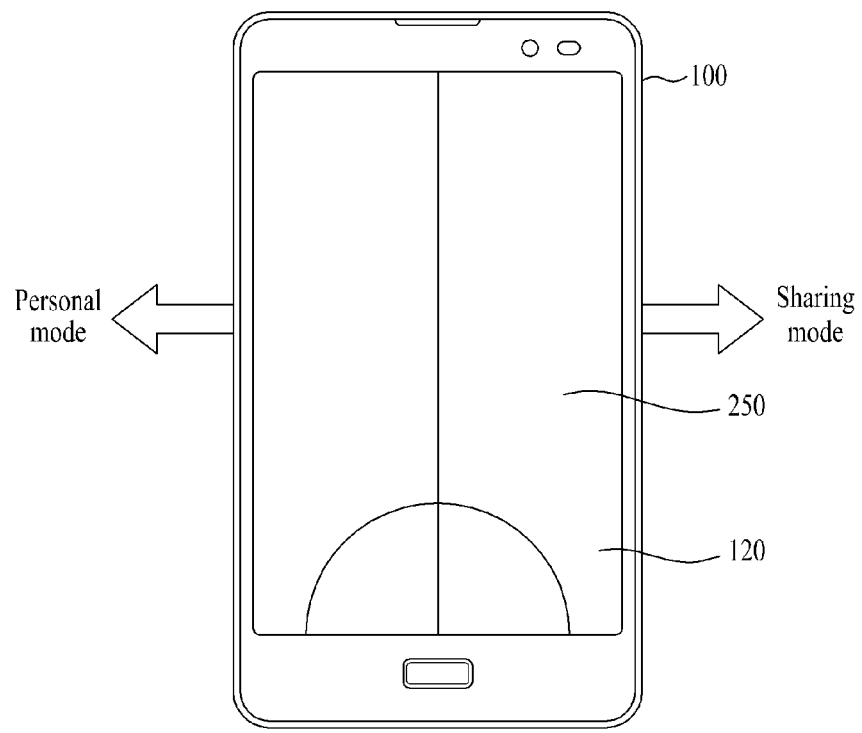
FIG. 10 is a view showing a mode selection interface according to an embodiment.

FIG. 10 is a view showing a mode selection interface according to an embodiment.

The mobile device 100 in the sharing standby mode may provide a mode selection interface 250. The mode selection interface 250 may include an interface to provide selection of the personal mode or the sharing mode. Referring to FIG. 10, the user may slide to the right side of the mobile device 100 on the display unit 120 to enter the sharing mode. On the other hand, in a case in which the user slides to the left side of the mobile device 100 on the display unit 120, a personal authentication input interface to switch to the personal mode may be provided. The mode selection interface 250 as described above is illustrative. The mode selection interface 250 may include a guide for mode selection. In addition, the mode selection interface 250 may include an image corresponding to the personal mode or the sharing mode. In addition to the above examples, various interfaces to provide selection between the personal mode and the sharing mode may be included as an embodiment.

Upon receiving selection of the personal mode, the mobile device 100 may display the personal authentication input interface on the display unit 120. Upon receiving a personal authentication input coinciding with predetermined personal authentication information in response to the personal authentication input interface, the mobile device 100 may switch to the personal mode. In addition, upon receiving selection of the sharing mode, the mobile device 100 may switch to the sharing mode.

Figure 11:
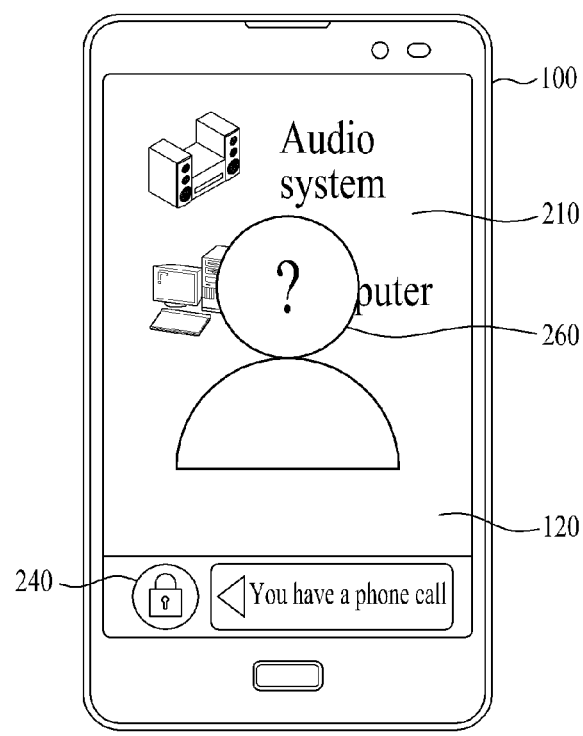
FIG. 11 is a view showing the mobile device receiving a call in a sharing mode according to an embodiment.

FIG. 11 is a view showing the mobile device receiving a call in the sharing mode according to an embodiment.

In the sharing mode, the mobile device 100 may receive a call or a message. In general, upon receiving the call or the message, the mobile device 100 may provide information (for example, a sender or content of the message) related to the call or the message. However, the information related to the received call or message may expose privacy of the user of the mobile device 100 since the mobile device 100 in the sharing mode may be used by any unauthorized user.

Referring to FIG. 11, a list 210 of controllable external devices is displayed on the display unit 120 of the mobile device 100. Consequently, the mobile device 100 is in the sharing mode. The mobile device 100 in the sharing mode receives a call. In this case, the mobile device 100 an indicator 260 corresponding to reception of the call. In the sharing mode, the indicator may not include information other than reception of the call to prevent exposure of privacy of the user of the mobile device 100. That is, the mobile device 100 does not provide information of the sender. The indicator 260 shown in FIG. 11 is illustrative. Various indicators may be provided to inform reception of the call or the message. In addition, upon receiving the message, the mobile device 100 in the sharing mode may provide an indicator 260 which does not include the content and sender of the message. However, the indicator 260 may include the content or sender of the message, which may be changed based on selection of a user or a manufacturer.

Meanwhile, the indicator 260 may include an interface (not shown) to respond to the reception of the call or to check the message. In general, the user may touch the indicator 260 to respond to the reception of the call. In a case in which the mobile device 100 is in the sharing mode, however, it is necessary to restrict response to the reception of the call or checking of the message. In a case in which the mobile device 100 is in the sharing mode, therefore, the mobile device 100 may restrict an input to the indicator 260. That is, in a case in which the mobile device 100 is in the sharing mode, it is not possible for the user to respond to the reception of the call or the message.

Instead, in a case in which the mobile device 100 in the sharing mode receives the call or the message, the mobile device 100 may provide a personal authentication input interface 240. Upon receiving a personal authentication input coinciding with predetermined personal authentication information through the personal authentication input interface 240, the mobile device 100 switches from the sharing mode to the personal mode. The mobile device 100 having switched to the personal mode provides overall access to the mobile device 100. Consequently, it is possible for the user to respond to the received call or check the received message.

The operations of the mobile device previously described with reference to FIGS. 3 to 11 may be combined. In addition, the operations of the mobile device may be performed by the mobile device previously described with reference to FIG. 2.

FIG. 12 is a flowchart showing a control method of the mobile device according to an embodiment.

The control method of the mobile device shown in FIG. 12 may be performed by the mobile device of the present specification previously described with reference to FIGS. 1 to 11.

First, the mobile device receives device information from at least one external device (1201). In addition, the mobile device may detect at least one controllable external device based on the received device information (1202). This may be performed by the communication unit and/or the processor previously described with reference to FIG. 2. In a case in which the mobile device is charging or an input to the mobile device is not sensed for a predetermined time, the mobile device may switch to a sharing standby mode (1203), the details of which have been previously described with reference to FIG. 3.

The mobile device in the sharing standby mode determines whether a personal authentication input coinciding with personal authentication information has been received by the mobile device (1204). Various personal authentication inputs may be received as previously described with reference to FIG. 3. Upon receiving a personal authentication input coinciding with the personal authentication information, the mobile device switches to a personal mode (1205). On the other hand, upon receiving an input other than the personal authentication input, the mobile device switches to a sharing mode (1206). The personal mode and the sharing mode have been described in detail with reference to FIGS. 3 to 11. The control method of the mobile device shown in FIG. 12 may be combined with the operations of the mobile device previously described with reference to FIGS. 3 to 11.

The mobile device according to the present specification and the control method thereof may not be limitedly applied to the constructions and methods of the embodiments as previously described; however, all or some of the embodiments may be selectively combined to achieve various modifications.

Meanwhile, the control method of the mobile device according to the present specification may be implemented as code that can be written on a processor-readable recording medium and thus read by a processor provided in the camera or the vehicle. The processor-readable recording medium may be any type of recording device in which data is stored in a processor-readable manner. The processor-readable recording medium may include, for example, a read only memory (ROM), a random access memory (RAM), a compact disc read only memory (CD-ROM), a magnetic tape, a floppy disc, and an optical data storage device and may be implemented in the form of a carrier wave transmitted over the Internet. The processor-readable recording medium may be distributed over a plurality of computer systems connected to a network such that processor-readable code is written thereto and executed therefrom in a decentralized manner.

As is apparent from the above description, it is possible for the mobile device according to the present specification to provide control of an external device while protecting privacy.

In addition, it is possible for the mobile device according to the present specification to easily perform switching between modes using an improved user interface.

It will be apparent that, although the preferred embodiments have been shown and described above, the present specification is not limited to the above-described specific embodiments, and various modifications and variations can be made by those skilled in the art without departing from the gist of the appended claims. Thus, it is intended that the modifications and variations should not be understood independently of the technical spirit or prospect of the present specification.

What is claimed is:
1. A mobile device comprising:
a display unit;

a communication unit configured to communicate with external devices over a wired or wireless network and to receive device information from at least one of the external devices; and a processor configured to control the display unit and the communication unit, wherein the processor is further configured to:

detect at least one controllable external device from the external devices based on the received device information, switch the mobile device to a sharing standby mode when the mobile device is charging or no input is sensed in the mobile device for a predetermined time, switch the mobile device to a personal mode when the mobile device in the sharing standby mode receives a personal authentication input coinciding with predetermined personal authentication information, the personal mode comprising access to the mobile device and the at least one controllable external device, and switch the mobile device to a sharing mode when the mobile device in the sharing standby mode receives an input other than the personal authentication input, the sharing mode comprising access only to the at least one controllable external device.

2. The mobile device according to claim 1, wherein the processor is further configured to display a control interface configured to provide control of the at least one controllable external device on the display unit when the mobile device switches to the sharing mode.

3. The mobile device according to claim 2, wherein
the processor is further configured to provide a list of the at least one controllable external device to the control interface based on the received device information, and
the list comprises at least one selected from a name, an icon, and a state of the at least one controllable external device.

4. The mobile device according to claim 3, wherein
the processor is further configured to align the list based on the state of the at least one controllable external device, and
the state comprises at least one selected from a position, an operational possibility, and a function of the at least one controllable external device.

5. The mobile device according to claim 2, further comprising:
a memory; and
a positioning unit configured to determine a position of the mobile device based on at least one selected from between a satellite and a network, wherein
the processor is further configured to:
store information of the external devices related to the position of the mobile device in the memory, and
provide a list of the at least one controllable external device to the control interface based on the received information of the external devices related to the position of the mobile device and the received device information, and
the list comprises at least one selected from a name, an icon, and a state of the at least one controllable external device.

6. The mobile device according to claim 2, further comprising:
a positioning unit configured to determine a position of the mobile device based on at least one selected from between a satellite and a network; and
an orientation sensing unit configured to sense an orientation of the mobile device, wherein
the processor is further configured to:

select one controllable external device from the at least one controllable external device based on the position and the orientation of the mobile device when the mobile device is in the sharing mode, and
display the control interface configured to provide control of the selected one controllable external device on the display unit.

7. The mobile device according to claim 2, further comprising:
a voice receiving unit, wherein
the processor is further configured to:
receive a voice input through the voice receiving unit and perform voice recognition based on the received voice input, and
control the at least one controllable external device based on the voice recognition.

8. The mobile device according to claim 7, wherein the processor is further configured to:
identify a user based on the received voice input,
match the identified user with each external device,
display a control interface configured to provide control of one of the at least one controllable external device matched with the identified user on the display unit when the mobile device in the sharing standby mode receives a voice input, and
control the matched external device based on the voice recognition.

9. The mobile device according to claim 2, wherein the control interface comprises an icon configured to trigger a personal authentication input receiving interface configured to receive the personal authentication input.

10. The mobile device according to claim 3, wherein the processor is further configured to display the list on the display unit based on the position of the at least one controllable external device.

11. The mobile device according to claim 3, further comprising:
a memory, wherein
the processor is further configured to:
store a use history of the at least one controllable external device in the memory, and
align the list based on the stored use history.

12. The mobile device according to claim 3, wherein
the processor is further configured to:
receive selection of one controllable external device from the list, and
display the control interface selected from a plurality of predetermined device control interfaces on the display unit based on type of the selected one controllable external device, and
the predetermined device control interfaces comprise control corresponding to different types of external devices and each type of external device.

13. The mobile device according to claim 12, wherein
the communication unit is further configured to access Internet over the wired or wireless network, and
the control corresponding to each type of external device comprises:
mirroring of display when the external device comprises a display means, and
tethering of data when the external device is accessible to the Internet.

14. The mobile device according to claim 1, wherein the processor is further configured to:

display a mode selection interface configured to provide selection of the personal mode or the sharing mode on the display unit when the mobile device switches to the sharing standby mode, display a personal authentication input interface on the display unit upon receiving selection of the personal mode, and switch the mobile device to the sharing mode upon receiving selection of the sharing mode.

15. The mobile device according to claim 14, wherein the personal authentication input comprises at least one selected from a password, a pattern, a fingerprint recognition, a voice recognition, and an iris recognition.

16. The mobile device according to claim 14, wherein the mode selection interface comprises at least one selected from between a guide for mode selection and an image corresponding to each mode.

17. The mobile device according to claim 1, wherein the processor is further configured to:

upon receiving generation of an event for the mobile device when the mobile device is in the sharing standby mode or the sharing mode, display an indicator configured to indicate generation of the event on the display unit, and restrict an input to the displayed indicator in the sharing standby mode or the sharing mode.

18. The mobile device according to claim 17, wherein the processor is further configured to provide a personal authentication input interface upon receiving generation of the event for the mobile device when the mobile device is in the sharing mode.

19. The mobile device according to claim 18, wherein the processor is further configured to switch the mobile device from the sharing mode to the personal mode upon receiving the personal authentication input in response to the personal authentication input interface.

20. A method of controlling an external device using a mobile device, the method comprising:

receiving device information from at least one external device over a wired or wireless network;

detecting at least one controllable external device based on the received device information;

switching the mobile device to a sharing standby mode when the mobile device is charging or when an input to the mobile device is not sensed for a predetermined time;

switching the mobile device to a personal mode when the mobile device in the sharing standby mode receives a personal authentication input; and switching the mobile device to a sharing mode when the mobile device in the sharing standby mode receives an input other than the personal authentication input, wherein the personal mode comprises access to the mobile device and the at least one controllable external device, and the sharing mode comprises access only to the at least one controllable external device.

\* \* \* \* \*